(12) United States Patent
Jiang

(10) Patent No.: US 8,362,433 B2
(45) Date of Patent: Jan. 29, 2013

(54) X-RAY DETECTOR FABRICATION METHODS AND APPARATUS THEREFROM

(75) Inventor: Haochuan Jiang, Brookfield, WI (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 13/112,105

(22) Filed: May 20, 2011

(65) Prior Publication Data

US 2011/0260377 A1 Oct. 27, 2011

Related U.S. Application Data

(63) Continuation of application No. 11/623,723, filed on Jan. 16, 2007, now Pat. No. 8,008,624.

(51) Int. Cl.
C04B 35/64 (2006.01)
C04B 33/32 (2006.01)
G01T 1/20 (2006.01)

(52) U.S. Cl. ............... 250/361 R; 250/370.11; 264/662; 264/664

(58) Field of Classification Search ............... 250/336.1, 250/361 R, 362, 367, 370.11, 301.4 R; 264/662–665, 654

See application file for complete search history.

(56) References Cited

U.S. PATENT DOCUMENTS

| 3,974,389 | A | 8/1976 | Ferri et al. |
|---|---|---|---|
| 4,405,691 | A | 9/1983 | Yale |
| 4,421,671 | A | 12/1983 | Cusano et al. |
| 4,473,513 | A | 9/1984 | Cusano et al. |
| 4,507,560 | A | 3/1985 | Mathers et al. |
| 4,525,628 | A | 6/1985 | DiBianca et al. |
| 4,783,596 | A | 11/1988 | Riedner et al. |
| 4,807,241 | A | 2/1989 | Berkstresser et al. |
| 5,057,692 | A | 10/1991 | Greskovich et al. |
| 5,096,614 | A | 3/1992 | Yale et al. |
| 6,143,200 | A | 11/2000 | Akiwa et al. |
| 7,008,558 | B2 | 3/2006 | Vartuli et al. |
| 2004/0067355 | A1 | 4/2004 | Yadav et al. |
| 2004/0100000 | A1* | 5/2004 | Kobusch et al. ............. 264/654 |
| 2005/0211916 | A1 | 9/2005 | Matsumoto et al. |
| 2005/0274895 | A1 | 12/2005 | Jiang et al. |

OTHER PUBLICATIONS

Leleckaite et al., "Sol-Gel Preparation and Characterization of Codoped Yttrium Aluminum Garnet Powders," Cheminform, vol. 37, Issue 7, 2006, Published Online: Nov. 21, 2005, pp. 2987-2993.

Garcia-Murillo et al., "Rare-Earth Actived Sol-Gel Films for Scintillator Applications," Journal of Sol-Gel Science and Technology, vol. 26, 2003, pp. 957-960.

Mansuy et al., "Scintillation of Sol-Gel Derived Lutetium Orthophosphate Doped with Rare Earth Ions," Journal of Sol-Gel Science and Technology, vol. 38, 2006, pp. 97-105.

\* cited by examiner

*Primary Examiner* — Walter L Lindsay, Jr.
*Assistant Examiner* — Jessica L Eley
(74) *Attorney, Agent, or Firm* — Ziolkowski Patent Solutions Group, SC

(57) ABSTRACT

A method of fabricating a scintillator includes forming a green part comprised of a nanometer-sized powder, sintering the green part at a first temperature for a first time period, and sintering the green part at a second temperature for a second time period.

17 Claims, 4 Drawing Sheets

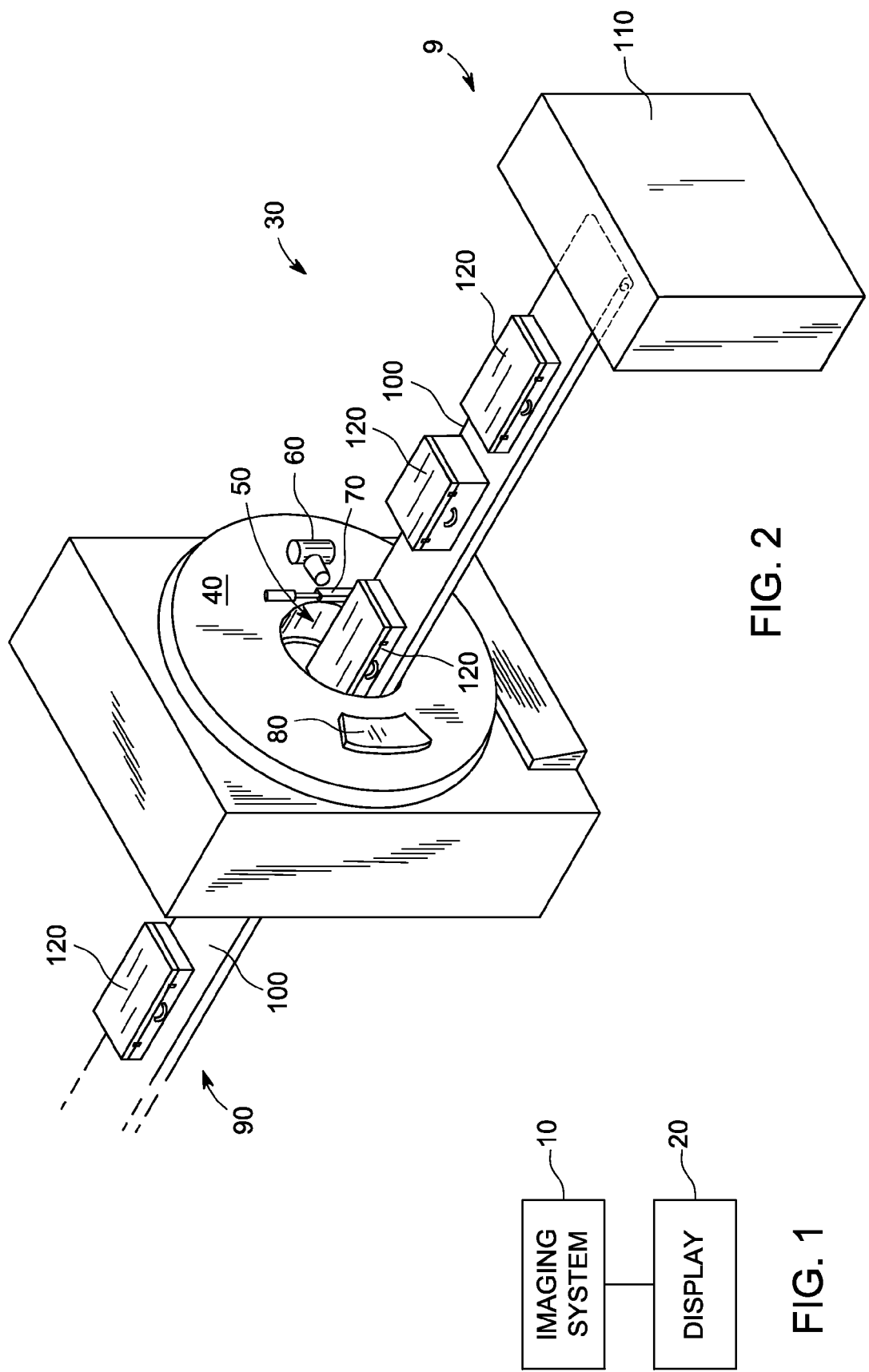

X-RAY DETECTOR FABRICATION METHODS AND APPARATUS THEREFROM

The present application is a continuation of and claims priority to U.S. patent application Ser. No. 11/623,723 filed Jan. 16, 2007, the disclosure of which is incorporated herein.

BACKGROUND OF THE INVENTION

This invention relates generally to imaging methods and apparatus, and more particularly, to methods and apparatus that provide for improvements in x-ray detector fabrication.

X-ray detectors typically include a photodiode portion and a scintillator portion. An x-ray enters the detector and impinges the scintillator material, wherein photons of visible light are created. The visible light then leaves the scintillator material and impinges a photodiode. The photodiodes are polled, returning attenuation measurements. This data is then used to create images.

Currently most of the scintillator ceramics are made from wet chemical processes. The wet chemical processes include dissolving all the ingredients in acid to make a homogeneous solution and the coprecipitation to convert the solution into a slurry. For instance, some scintillator ceramics are made with the oxalate coprecipitation processes. First $Y_2O_3$, $Gd_2O_3$, $Eu_2O_3$, and other dopants are dissolved in nitric acid to prepare a nitrate solution. The nitrate solution is mixed with an oxalic acid solution through dual flow and mixing. During the mixing, the nitrate reacts with the oxalic acid to form insoluble oxalate (a mixture of yttrium oxalate, gadolinium oxalate, europium oxalate, and the oxalate of other dopants). Then the oxalate is filtered and washed with DI water (deionized). The wet cake is dried after filtration. The dried powder is then milled and calcined to form an oxide powder. The oxide powder is dry compacted and sintered into a transparent ceramic. The process for Lu—Tb—Al—O based garnet scintillator is very similar. A sulfate or nitrate solution is first prepared, then the solution is mixed with ammonium hydroxide solution to form the Lu—Tb—Al hydroxide gel as a slurry. The slurry is filtered, washed, dried, milled, and calcined sequentially afterwards.

One problem of this process is the agglomeration of powder and the complexity of the processes. Therefore, it is desirable to have a nanometer sized powder process for the ceramic scintillators to achieve a relatively high transparent scintillator material with a relatively lower sintering temperature and to reduce defects and manufacturing cost.

BRIEF DESCRIPTION OF THE INVENTION

In one aspect, a method includes fabricating an energy detector using a sol-gel process.

In another aspect, a detector includes a nanometer sized powder sintered with a grain size of less than 10μ.

In yet another aspect, a CT system includes a x-ray source configured to emit x-rays, a x-ray detector positioned to receive x-rays emitted by the source, and a computer operationally coupled to the source and detector, the detector comprising a nanometer sized powder sintered with a grain size of less than 10μ.

BRIEF DESCRIPTION OF THE DRAWINGS

FIG. 1 illustrates an exemplary diagnostic imaging system.
FIG. 2 illustrates a package/baggage inspection system.

DETAILED DESCRIPTION OF THE INVENTION

Figure 3:
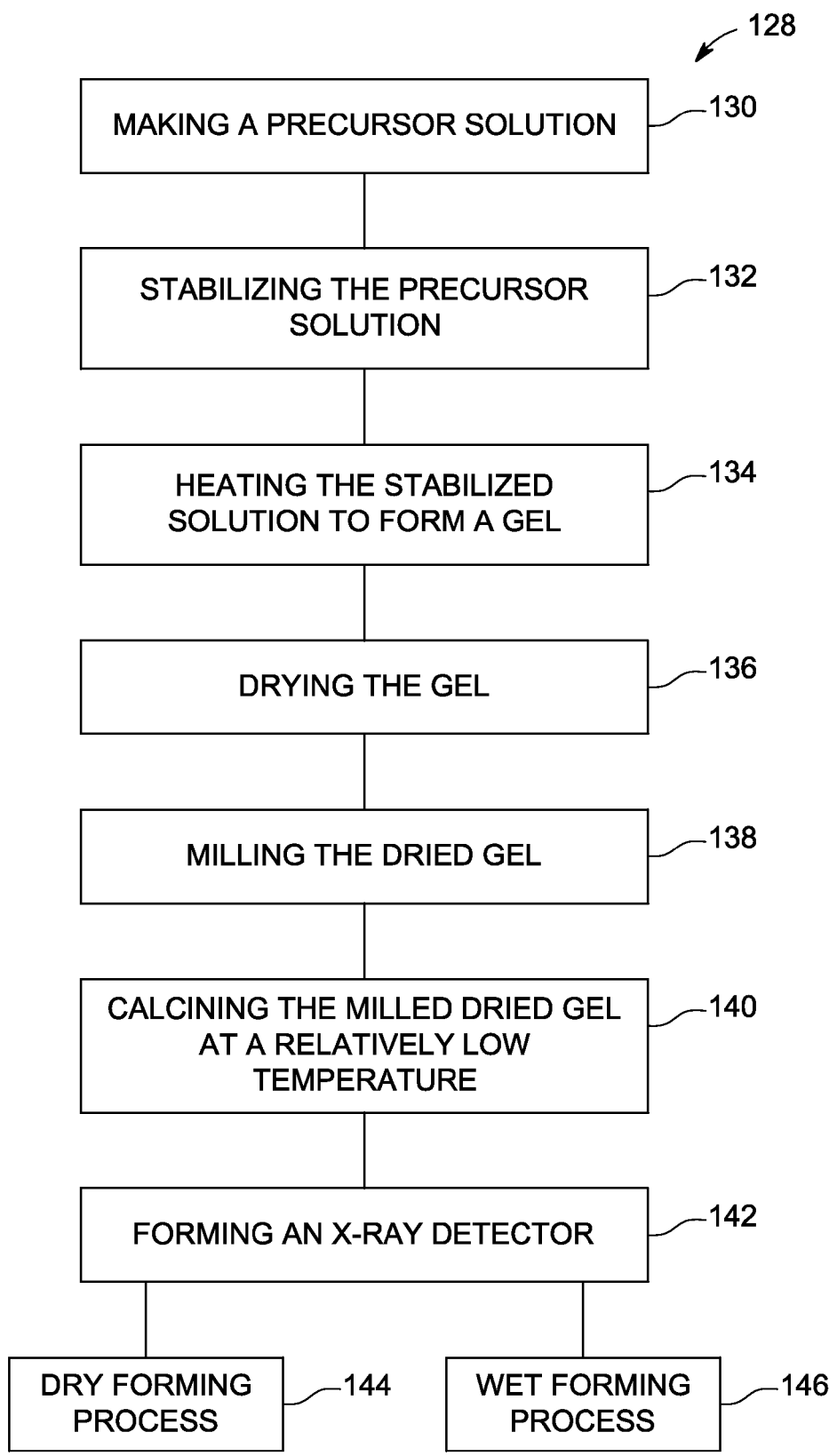
FIG. 3 illustrates a method of fabricating an x-ray detector.

There are herein described methods and apparatus useful for imaging systems such as, for example, but not limited to an x-ray system. The apparatus and methods are illustrated with reference to the figures wherein similar numbers indicate the same elements in all figures. Such figures are intended to be illustrative rather than limiting and are included herewith to facilitate explanation of an exemplary embodiment of the apparatus and methods of the invention. Although, described in the setting of an x-ray system, it is contemplated that the benefits of the invention accrue to all diagnostic imaging systems, all current modalities and/or any modality yet to be developed in which scintillators and reflectors are used.

FIG. 1 illustrates an imaging system 10 with an associated display 20. Imaging system 10 can be of any modality, but in one embodiment, system 10 is a CT system. In another embodiment, system 10 is a dual modality imaging system such as a combined CT/PET system and data can be acquired in one modality (e.g., CT) and the processed data can be transferred to the other modality (e.g., PET). Display 20 can be separate from system 10 or integrated with system 10. System 10 includes an acquisition device such as an x-ray radiation detector. It is contemplated that the benefits of the invention accrue to human and non-human imaging systems such as those systems typically employed in small animal research. Also, it is contemplated that the benefits of the invention accrue to non-medical imaging systems such as those systems typically employed in an industrial setting or a transportation setting, such as, for example, but not limited to, a baggage scanning CT system for an airport or other transportation center as shown in FIG. 2.

Referring now to FIG. 2, a package/baggage inspection system 30 includes a rotatable gantry 40 having an opening 50 therein through which packages or pieces of baggage may pass. The rotatable gantry 50 houses a high frequency electromagnetic energy source 60 aligned with an attenuation filter 70 as well as a detector assembly 80. A conveyor system 90 is also provided and includes a conveyor belt 100 supported by structure 110 to automatically and continuously pass packages or baggage pieces 120 through opening 50 to be scanned. Objects 120 are fed through opening 50 by conveyor belt 100, imaging data is then acquired, and the conveyor belt 100 removes the packages 120 from opening 50 in a controlled and continuous manner. As a result, postal inspectors, baggage handlers, and other security personnel may non-invasively inspect the contents of packages 120 for explosives, knives, guns, contraband, and the like.

FIG. 3 illustrates a method 128 that can include the step of making a precursor solution 130, the step of stabilizing the precursor solution 132, and heating the stabilized solution to form a gel 134. Method 128 also can include drying the gel at step 136, milling the dried gel at step 138, and calcining the milled dried gel at a relatively low temperature at step 140.

Additionally method 128 can include the step 142 of forming an x-ray detector. The forming may be done using a dry forming process 144 or a wet forming process 146 as described in more detail below.

Herein described are methods and apparatus that facilitate the making of a nanometer-structured ceramic scintillator. The herein described methods and apparatus apply to all ceramic scintillator materials with a cubic structure. The scintillator compositions covered in this disclosure include ones based on $Y_2O_3$—$Gd_2O_3$—$Eu_2O_3$, GGG based on $Gd_2O_3$—$Ga_2O_3$:Cr, and Lu—Tb—Al—O:Ce system ceramic scintillators. First, a nanometer ceramic powder with very low agglomeration is produced by a sol-gel (solution/gelatin) method. Then the nanometer powder is sintered into a transparent ceramic at a relatively low temperature. In the sol-gel process, the chemicals have to be carefully selected for making the precursor solution and gel. In the Lu—Tb—Al—O—Ce system, one example of the starting materials is lutetium acetate hydrate (>99.99%) ($Lu(O_2CCH_3)_3 \cdot xH_2O$), terbium acetate hydrate (>99.99%) ($Tb(O_2CCH_3)_3 \cdot xH_2O$), cerium nitrate (>99.99%) ($Ce(NO_3)_3 \cdot 6H_2O$), and aluminum formate hydrate (>99.99) ($Al(O_2CH)_3 \cdot 3H_2O$) with the proper ratio (for example $Lu_{0.8}Tb_{2.17}Ce_{0.03}Al_5O_{12}$) are dissolved in hot DI water (deionized). The certain amount of formic acid, ethylene glycol, and isobutyric acid are added to stabilize the solution. The solution is heated to about 60° C. to 80° C. to remove some water and increase the viscosity by polymerization. Once the solution becomes a transparent gel with proper viscosity, it can be moved into a furnace for drying at about 100° C. to 200° C. The dried powder is then ball milled or jet milled to prevent hard agglomeration. After milling, the powder is calcined at about 600° C. to 900° C. The lower calcining temperature avoids hard agglomeration. This process yields a nanometer-sized ceramic powder that is highly sinterable and highly flow-able. The powder is now ready for further processing.

In the Y—Gd—Eu—O:Pr system, one example of the starting material is yttrium acetate hydrate (>99.99%) ($Y(O_2CCH_3)_3 \cdot xH_2O$), Gadolinium acetate hydrate (>99.99%) ($Gd(O_2CCH_3)_3 \cdot xH_2O$), and europium acetate hydrate (>99.99%) ($Eu(O_2CCH_3)_3 \cdot xH_2O$), and $Pr(NO_3)_3 \cdot xH_2O$ (>99.99%). The alkoxides of a desired ratio are mixed together and dissolved in DI water. Then the praseodymium nitrate can be added into the solution. A certain amount of ethylene glycol and nitric acid can be added to make a transparent solution. The solution is then heated to about 60° C.-80° C. for the polymerization. Once the solution becomes a transparent gel with proper viscosity, it can be moved into a furnace for drying at about 100° C. to 200° C. The dried powder can then be ball milled or jet milled to prevent hard agglomeration. After milling, the powder may be calcined at about 600° C. to 900° C. The lower calcining temperature avoids hard agglomeration. This process yields a nanometer-sized ceramic powder that is highly sinterable and highly flow-able.

For the GGG scintillator, the starting materials is gadolinium acetate hydrate (>99.99%) ($Gd(O_2CCH_3)_3 \cdot xH_2O$), gallium acetate hydrate (>99.99%) ($Ga(O_2CCH_3)_3 \cdot xH_2O$), and chromium acetate hydrate ($Cr(O_2CCH_3)_3 \cdot xH_2O$). The raw materials with the proper ratio to yield $Gd_{3-x}Cr_xGa_5O_{12}$ (x=0.01-0.05) are dissolved in hot DI water. An amount of formic acid, ethylene glycol, and isobutyric acid are added to stabilize the solution. The solution is heated at about 60 to 80° C. to dry the water and increase the viscosity by polymerization. Once the solution becomes a transparent gel with the proper viscosity, it can be moved into a furnace for drying at about 100° C. to 200° C. The dried powder can then be ball milled or jet milled to prevent hard agglomeration. After milling, the powder can be calcined at about 600° C. to 900° C. The lower calcining temperature avoids hard agglomeration. This process yields a nanometer-sized ceramic powder that is highly sinterable and highly flow-able. The powder is now ready for further processing.

Once the nanometer sized powder is obtained, it can be formed into a ceramic green part by either dry compact method or wet cast method.

For the dry compact method, the ceramic blocks can be sintered in a hydrogen or a vacuum furnace. One goal of the sintering is to achieve a relatively high transparency at the lowest temperature possible. In order to achieve that, the grain growth has to be controlled. For a normal ceramic system such as laser ceramic, a sintering aid is added to restrict the grain growth so densification can occur without trapping the pores. Due to the special requirements of the scintillators, the sintering aid can not be used. Without the sintering aid, one needs to ensure that the pores stay at the grain boundaries so that any gas inside the pores can diffuse out quickly. Toward that end, a two stage sintering method was developed to achieve the high densification without any significant grain growth and to achieve a nanometer-structured ceramic scintillator. First, the ceramic is heated to the highest temperature of the process and held at that temperature for very short time, then the ceramic is cooled down to a lower temperature and held for much longer time. For instance, the dry-compacted and further iso-pressed Y—Gd—Eu—O:Pr ceramic is heated to about 1850° C. to 1950° C. and held for about 10 minutes to 1 hour, typically 30 minutes; Then the ceramic can be cooled down to about 1600° C. to 1700° C. and held for about 5 hours to 10 hours. The sintering is done in a hydrogen atmosphere. The higher temperature hold is to provide energy to grow necks between particles and pin the pores between grain boundaries. The low temperature hold is to provide sufficient energy for the pores to diffuse out of the ceramic through grain boundaries while preventing significant grain growth. Typically the grain size can be less than 1 to 2 microns, compared to normal sintering process that leads to over 20 micron grain size. Note, the herein described methods and apparatus provide a nanometer sized powder sintered with a grain size of less than 10μ.

For the Lu—Tb—Al—O:Ce system ceramic scintillator, the dry-compacted ceramic blocks are further iso-pressed to increase green density. The ceramic blocks can then be sintered in a vacuum. First, the ceramic blocks can be heated to about 1650° C. to 1750° C. and held for about 15 minutes to 1 hour, typically 30 minutes. Then the ceramic blocks are cooled down to about 1500° C. to 1600° C. and held for 5 to 10 hours. The mechanisms of control grain growth and achieving full densification are the same as described above. The similar process applies to GGG ceramic scintillator.

The alternative method to the dry compact method is the wet cast method. The nanometer sized-ceramic powder can be mixed with DI water and a small amount of dispersant to form a slurry. Then the slurry can be cast into a mold with required dimensions. The slurry can be allowed to dry in the mold and then taken out for further processing. After drying, the green ceramic blocks can be heated in oxygen to about 600° C. to remove all the dispersant and water and other additives. The sintering process as described above can be performed afterwards.

One important aspect of the herein described methods and apparatus is to achieve nanometer sized ceramic powder with no hard agglomeration and sintering the ceramic without significant grain growth. It provides for full densification and the relatively high transparency of the resulting scintillator while making it possible to sinter at a relatively low temperature and without relatively high pressure methods such as hot pressing and hot iso-static pressing. This provides better performance and lower manufacturing cost.

Figure 4:
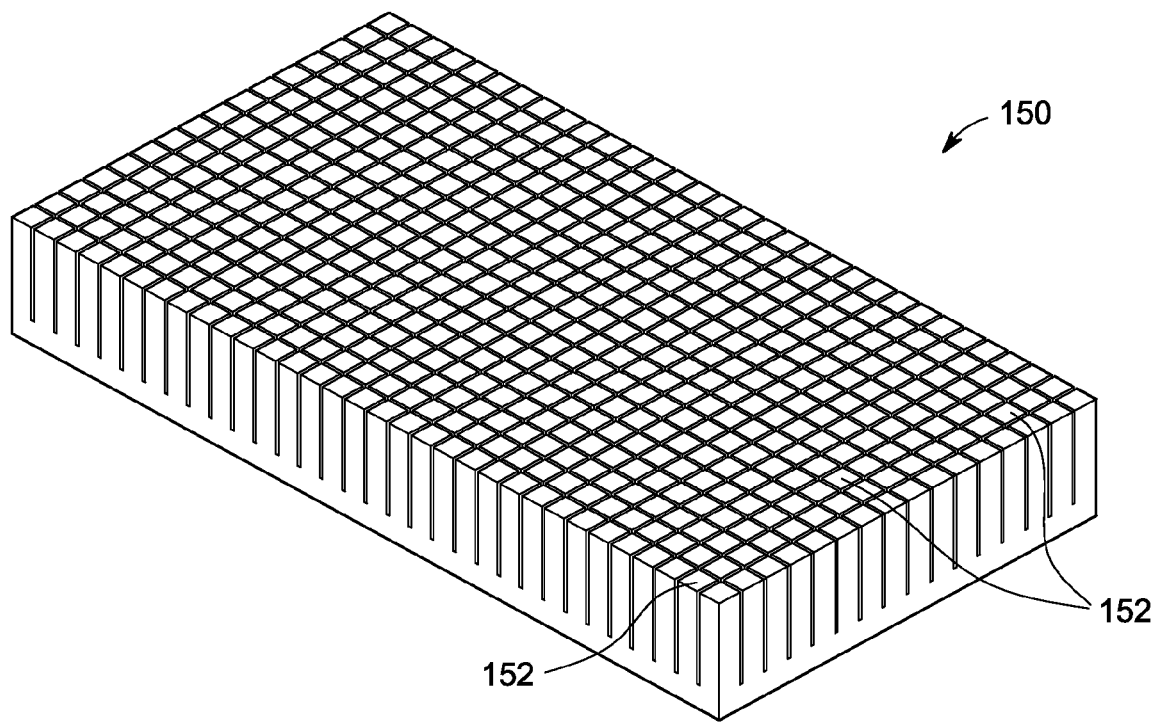
FIG. 4 illustrates a pixelated scintillator pack without a reflector.
Figure 5:
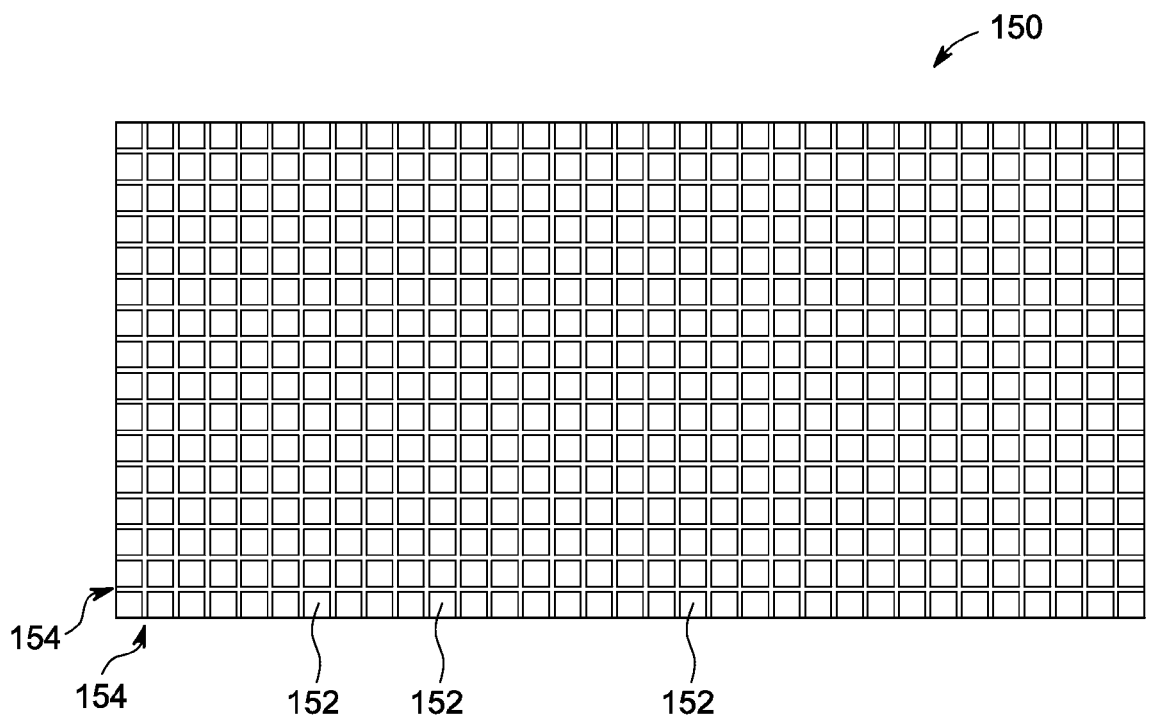
FIG. 5 is a view of the pixelated scintillator pack shown in FIG. 4 looking from the photon exit direction and illustrating reflector material between pixels.
Figure 6:
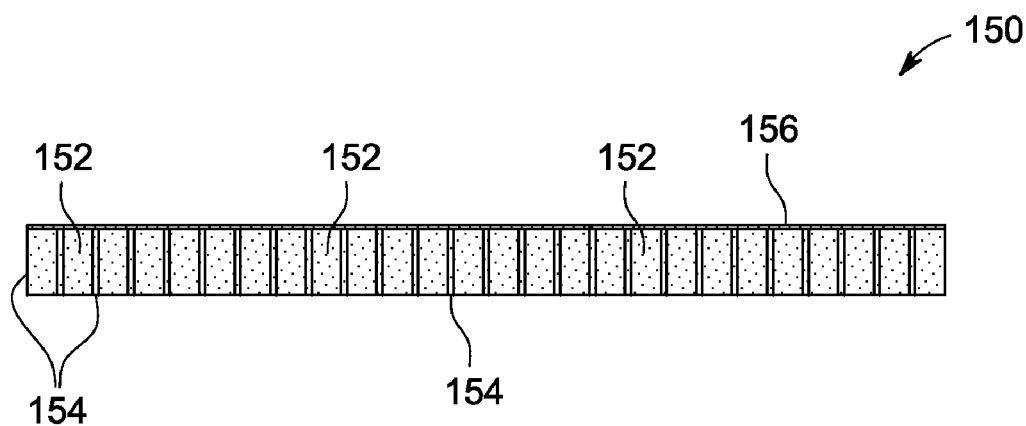
FIG. 6 is a cross-sectional view also illustrating the scintillator pack of FIG. 4 with a reflector positioned between pixels and a top reflector.

FIG. 4 illustrates a pixelated scintillator pack 150 including a plurality of pixels 152. Note there is no reflector yet. FIG. 5 is a view of pixelated scintillator pack 150 looking from the photon exit direction, and illustrates reflector material 154 (which is white in the drawing) between pixels 152. FIG. 6 is a cross-sectional view also illustrating scintillator pack 150 with reflector 154 positioned between pixels 152 and a top reflector 156. Note, energy enters into the top of scintillator pack 150 as viewed looking straight on in FIG. 6 as x-ray energy and this energy is converted to visible photons by the scintillation material within a pixel 152, and these visible photons then impinge a photodiode that would be on the bottom side of pack 150 viewing FIG. 6 straight on.

Figure 7:
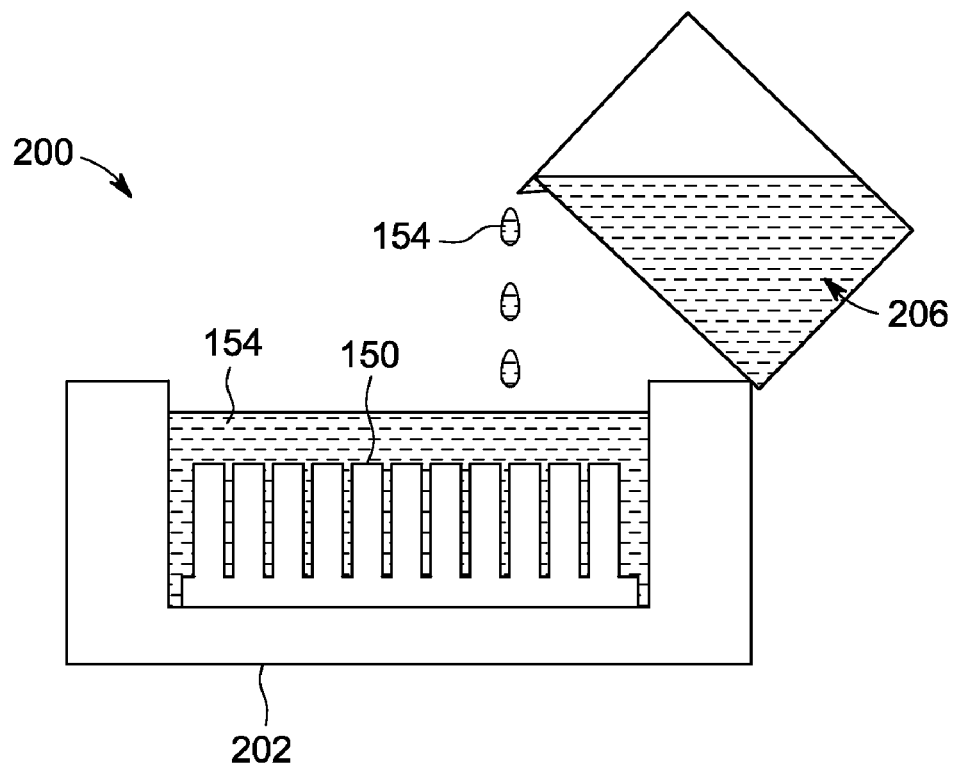
FIG. 7 illustrates a process wherein a mold is provided and within the mold, the pixelated scintillator array of FIGS. 4-6 is placed.

FIG. 7 illustrates a process 200 wherein a mold 202 is provided and within the mold, pixelated scintillator array 150 is placed. Reflector material 154 in a slurry state is then poured into mold 202. As shown in FIG. 7, reflector material 154 may be delivered using a beaker 206. However, any delivery system may be employed including pipes and robots. The reflector 154 is then solidified in the mold 202. Afterwards, the entire assembly is taken out of the mold and machined to the desired geometry (final scintillator pack).

As used herein, an element or step recited in the singular and proceeded with the word "a" or "an" should be understood as not excluding plural said elements or steps, unless such exclusion is explicitly recited. Furthermore, references to "one embodiment" of the present invention are not intended to be interpreted as excluding the existence of additional embodiments that also incorporate the recited features.

Technical effects include that the herein described methods and apparatus allow for a nanometer-structure ceramic scintillator with relatively low defects and more uniform properties. The herein described methods and apparatus allow for a low sintering temperature based on nanometer-powder process. The herein described methods and apparatus allow for a relatively high transparency of the ceramic scintillator that leads to high light output and more uniform spectral performance.

Exemplary embodiments are described above in detail. The assemblies and methods are not limited to the specific embodiments described herein, but rather, components of each assembly and/or method may be utilized independently and separately from other components described herein.

While the invention has been described in terms of various specific embodiments, those skilled in the art will recognize that the invention can be practiced with modification within the spirit and scope of the claims.

What is claimed is:

1. A method of fabricating a scintillator comprising:
   forming a green part comprised of a nanometer-sized powder;
   sintering the green part at a first temperature for a first time period; and
   sintering the green part at a second temperature for a second time period; wherein:
   the second temperature is lower than the first temperature; and
   the second time period is a longer duration than the first time period.

2. The method of claim 1 comprising producing the nanometer-sized powder using the steps of:
   making a precursor solution;
   stabilizing the solution;
   heating the solution to form a gel;
   drying the gel;
   milling the dried gel; and
   calcining the milled dried gel to form the nanometer-sized powder.

3. The method of claim 1 comprising producing the nanometer-sized powder using a compound that includes at least one of yttrium, gallium, aluminum, gadolinium, europium, lutetium, and terbium.

4. The method of claim 1 wherein the nanometer-sized powder comprises Y—Gd—Eu—O:Pr, and wherein:
   the first temperature ranges between 1850° C. and 1950° C.;
   the first time period is between 10 minutes and 1 hour;
   the second temperature ranges between 1600° C. and 1700° C.; and
   the second time period is between 5 hours and 10 hours.

5. The method of claim 1 wherein the nanometer-sized powder comprises one of Lu—Tb—Al—O:Ce, and GGG (Gd—Ga—O:Cr), and wherein:
   the first temperature ranges between 1650° C. and 1750° C.;
   the first time period is between 15 minutes and 1 hour;
   the second temperature ranges between 1500° C. and 1600° C.; and
   the second time period is between 5 hours and 10 hours.

6. A method of fabricating a scintillator comprising:
   forming a green part comprised of a nanometer-sized powder;
   diffusing gas from the green part using a two-stage sintering process, the two-stage sintering process comprising:
   heating the green part to a first temperature for a first time duration; and
   subsequently heating the green part to a second temperature that is different from the first temperature;
   wherein the two-stage sintering process comprises heating the green part to the second temperature for a second time duration, wherein the first temperature is greater than the second temperature, and wherein the first time duration is shorter than the second time duration.

7. The method of claim 6 comprising producing the nanometer-sized powder using the steps of:
   making a precursor solution;
   stabilizing the solution;
   heating the solution to form a gel;
   drying the gel;
   milling the dried gel; and
   calcining the milled dried gel to form the nanometer-sized powder.

8. The method of claim 6 wherein the nanometer-sized powder comprises Y—Gd—Eu—O:Pr, and wherein:
   the first temperature ranges between 1850° C. and 1950° C.;
   the first time duration is between 10 minutes and 1 hour;
   the second temperature ranges between 1600° C. and 1700° C.; and
   the second time duration is between 5 hours and 10 hours.

9. The method of claim 6 wherein the nanometer-sized powder comprises one of Lu—Tb—Al—O:Ce, and GGG (Gd—Ga—O:Cr), and wherein:
   the first temperature ranges between 1650° C. and 1750° C.;
   the first time duration is between 15 minutes and 1 hour;
   the second temperature ranges between 1500° C. and 1600° C.; and
   the second time duration is between 5 hours and 10 hours.

10. A method of controlling grain growth in a scintillator fabrication process comprising:
- obtaining a ceramic green part comprised of a nanometer-sized powder;
- maintaining the ceramic green part at a first temperature for a first time period; and
- heating the ceramic green part to a second temperature for a second time period; wherein:
- the second temperature is lower than the first temperature; and
- the second time period is a longer duration than the first time period.

11. The method of claim 10 comprising forming the ceramic green part using one of a dry compact method and a wet cast method.

12. A method of fabricating a scintillator comprising:
- forming a green part comprised of a nanometer-sized powder with the following steps:
  - forming a slurry by mixing the nanometer-sized powder with at least DI water;
  - drying the slurry;
  - forming the green part with the dried slurry; and
  - heating the green part to remove at least the DI water; and
- diffusing gas from the green part using a two-stage sintering process, the two-stage sintering process comprising:
  - heating the green part to a first temperature; and
  - subsequently heating the green part to a second temperature that is different from the first temperature.

13. A method of fabricating a scintillator comprising:
- forming a green part comprised of a nanometer-sized powder;
  - forming a slurry by mixing the nanometer-sized powder with at least DI water;
  - drying the slurry;
  - forming the green part with the dried slurry;
  - sintering the green part at a first temperature for a first time period;
  - sintering the green part at a second temperature for a second time period; and
  - heating the green part to remove at least the DI water.

14. The method of claim 13 wherein heating the green part comprises heating the green part to approximately 600° C.

15. A method of fabricating a scintillator comprising:
- forming a green part comprised of a nanometer-sized powder;
- diffusing gas from the green part using a two-stage sintering process, the two-stage sintering process comprising:
  - heating the green part to a first temperature for a first time duration; and
  - subsequently heating the green part to a second temperature that is different from the first temperature;
- forming a slurry by mixing the nanometer-sized powder with at least DI water;
- drying the slurry;
- forming the green part with the dried slurry; and
- heating the green part to remove at least the DI water.

16. The method of claim 15 wherein heating the green part comprises heating the green part to approximately 600° C.

17. A method of controlling grain growth in a scintillator fabrication process comprising:
- obtaining a ceramic green part comprised of a nanometer-sized powder;
- maintaining the ceramic green part at a first temperature for a first time period; and
- heating the ceramic green part to a second temperature for a second time period;
- wherein the nanometer-sized powder comprises one of Y—Gd—Eu—O:Pr, Lu—Tb—Al—O:Ce, and GGG (Gd—Ga—O:Cr).

* * * * *